US010802107B2

(12) United States Patent
Shams et al.

(10) Patent No.: US 10,802,107 B2
(45) Date of Patent: Oct. 13, 2020

(54) ADAPTIVE ALGORITHM AND SOFTWARE FOR RECOGNITION OF GROUND-BASED, AIRBORNE, UNDERGROUND, AND UNDERWATER LOW FREQUENCY EVENTS

(71) Applicant: U.S.A., AS REPRESENTED BY THE ADMINISTRATOR OF THE NASA, Washington, DC (US)

(72) Inventors: Qamar A. Shams, Yorktown, VA (US); John W. Stoughton, Virginia Beach, VA (US); Allan J. Zuckerwar, Williamsburg, VA (US)

(73) Assignee: UNITED STATES OF AMERICA AS REPRESENTED BY THE ADMINISTRATOR OF NASA, Washington, DC (US)

( * ) Notice: Subject to any disclaimer, the term of this patent is extended or adjusted under 35 U.S.C. 154(b) by 366 days.

(21) Appl. No.: 15/875,205

(22) Filed: Jan. 19, 2018

(65) Prior Publication Data
US 2018/0210065 A1 Jul. 26, 2018

Related U.S. Application Data

(60) Provisional application No. 62/449,160, filed on Jan. 23, 2017.

(51) Int. Cl.
*G01S 5/22* (2006.01)
*G01S 3/808* (2006.01)
(Continued)

(52) U.S. Cl.
CPC .............. *G01S 5/22* (2013.01); *G01S 3/8083* (2013.01); *G01S 3/801* (2013.01); *G01S 3/86* (2013.01)

(58) Field of Classification Search
CPC .......... G01S 5/22; G01S 3/8083; G01S 3/801; G01S 3/86
See application file for complete search history.

(56) References Cited

U.S. PATENT DOCUMENTS

| 6,034,760 A * | 3/2000 | Rees ..................... G01N 21/455 356/28.5 |
| 8,401,217 B2 | 3/2013 | Shams et al. |
| (Continued) | | |

OTHER PUBLICATIONS

Shams et al., A Portable Infrasonic Detection System, Aug. 2008, pp. 1-13. (Year: 2008).*

(Continued)

*Primary Examiner* — Daniel Pihulic
(74) *Attorney, Agent, or Firm* — M. Bruce Harper; Andrea Z. Warmbier; Robin W. Edwards

(57) ABSTRACT

A method for recognizing infrasound events includes detecting infrasonic source using one or more microphone arrays each having three equally-spaced infrasound microphones. The method includes identifying, via a data acquisition system (DAS), a level of coherence of the detected infrasonic acoustic signals from each possible pair of microphones and recognizing the infrasound source using the coherence and a time history of the detected signals. The method may include estimating source properties via the DAS, including a magnitude, azimuth angle, and elevation angle, and executing a control action in response to the estimated properties. A system includes the array and the DAS. The array may be positioned above or below ground, and may be connected to one or more aircraft in some embodiments.

20 Claims, 10 Drawing Sheets

(51) Int. Cl.
    *G01S 3/86*         (2006.01)
    *G01S 3/801*       (2006.01)

(56)            References Cited

U.S. PATENT DOCUMENTS

| | | | |
|---|---|---|---|
| 8,671,763 | B2 | 3/2014 | Zuckerwar et al. |
| 9,591,417 | B2 | 3/2017 | Shams et al. |
| 9,620,025 | B2 | 4/2017 | Shams et al. |
| 2005/0270906 | A1* | 12/2005 | Ramenzoni ............ H04R 5/027 367/99 |
| 2009/0022341 | A1* | 1/2009 | Shams .................. G01H 11/02 381/174 |
| 2011/0132095 | A1* | 6/2011 | Zuckerwar ............. G01H 11/06 73/658 |
| 2015/0264498 | A1* | 9/2015 | Shams .................. G01H 11/02 381/56 |
| 2018/0210065 | A1* | 7/2018 | Shams ...................... G01S 5/22 |
| 2019/0154874 | A1* | 5/2019 | Shams .................. G01W 1/08 |

OTHER PUBLICATIONS

R. J. Vaccaro et al., Least-squares time-delay estimation for transient signals in a multipath environment, J. Acoust. Soc. Am. 92 (1), Jul. 1992, pp. 210-218, The University of Rhode Island, Kingston, RI, USA.

\* cited by examiner

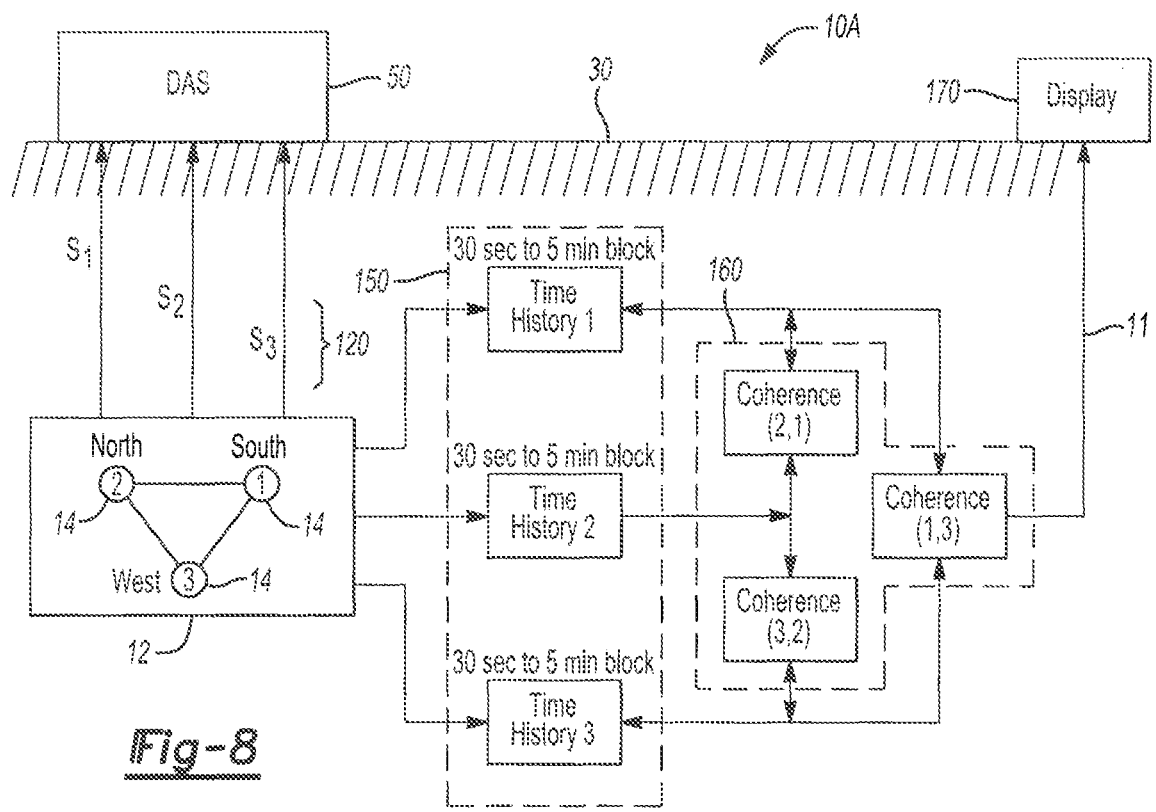
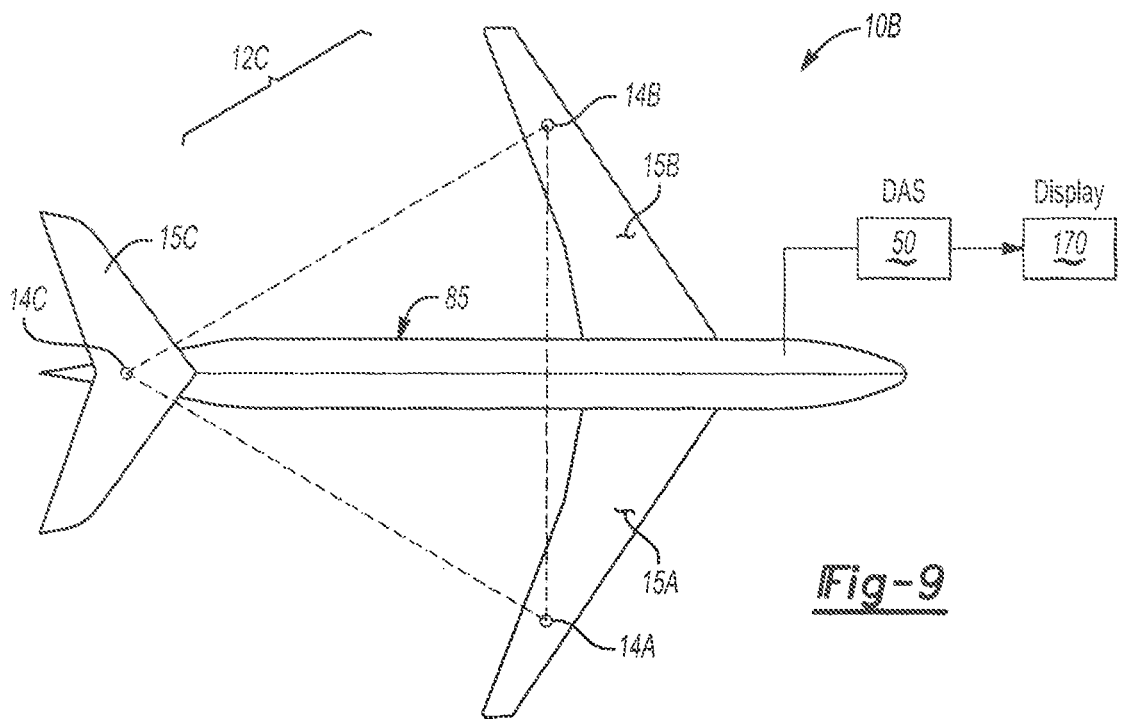

ADAPTIVE ALGORITHM AND SOFTWARE FOR RECOGNITION OF GROUND-BASED, AIRBORNE, UNDERGROUND, AND UNDERWATER LOW FREQUENCY EVENTS

CROSS-REFERENCE TO RELATED PATENT APPLICATIONS

This patent application claims the benefit of and priority to U.S. Provisional Patent Application No. 62/449,160 filed on Jan. 23, 2017, which is hereby incorporated by reference in its entirety.

STATEMENT REGARDING FEDERALLY SPONSORED RESEARCH OR DEVELOPMENT

The invention described herein was made by employees of the United States Government and may be manufactured and used by or for the Government of the United States of America for governmental purposes without the payment of any royalties thereon or therefor.

BACKGROUND

Human beings generally perceive sound at frequencies above 20 hertz (Hz), with frequencies below 20 Hz defining the infrasonic frequency range. Infrasonic frequencies or "infrasound" can be emitted by various natural and man-made infrasound sources. Clear air turbulence, microbursts, hurricanes, and tornadoes are examples of naturally occurring emitters of infrasound. Additional natural infrasound sources include volcanic eruptions, tsunamis, mountain waves, thunderstorms, meteor showers, and microbaroms, with the latter phenomenon generated by ongoing atmospheric interaction with ocean waves. Common manmade sources of infrasound include aircraft wave vortices, supersonic flight, wind turbine rotation, space vehicle launches, and explosive detonations, as well as the operation of propulsion systems of surface or submerged marine vessels.

Infrasonic waves tend to propagate over extended distances relative to the propagation of higher-frequency sound waves. For example, a thunderstorm may be audible to a human listener within a range of about 10 kilometers, while infrasound waves emitted by the same thunderstorm may be detectable hundreds of kilometers away with very little waveform attenuation. The reason for this is twofold. First, atmospheric absorption of infrasonic wave energy is practically negligible. Second, the Earth's atmosphere creates an acoustic ceiling of sorts, at which point a positive gradient of sonic speed at increasing altitudes reflects the infrasonic wave energy back toward the Earth's surface.

In a conventional audio microphone, a capillary vent hole provides static equalization on opposite sides of an internal membrane. The capillary vent hole acoustically couples a back chamber of the microphone to the surrounding ambient. However, such a pressure equalization system may experience a roll off of the acoustic response at lower frequencies. This and several other acoustic properties of conventional microphones can reduce the suitability of such microphones for use in detection of infrasound waves. As a result, low-frequency microphones and acoustic measurements systems have been developed that are capable of outdoor infrasound detection in portable and easily deployable packages. Two examples are disclosed in U.S. Pat. Nos. 8,401,217 and 9,591,417, the entire contents of which are incorporated by reference.

Existing systems and methodologies for measuring infrasound also tend to rely on widely-dispersed microphones and the use of surface or sub-surface wind filters, e.g., rosette filters and microporous "soaker hoses". While these devices are useful in many types of acoustic applications, conventional acoustic signal collection and processing techniques can lead to reduced coherence and increased aliasing of the received acoustic signals. A need therefore exists for smaller infrasound acoustic arrays and related processing methods, particularly those that are able to reduce time delay resolution and improve tracking accuracy, particularly of mobile emitters of infrasound.

SUMMARY

A method is disclosed herein for adaptively recognizing and tracking mobile sources of infrasound, i.e., sound waves having frequencies of less than about 20 hertz (Hz). Infrasound events that are recognized and tracked using the present method may initiate in the Earth's atmosphere, on or below ground or a water surface, or on other planets or their orbiting moons depending on the application, with minor accompanying adjustments to the layout of the acoustic signal collection and processing hardware devices disclosed herein.

In an example embodiment of a system employing the present method, a microphone array of three infrasound microphones is arranged in an equilateral triangle pattern. More than one such array may be used to cover a larger geographical area and improve tracking accuracy of an infrasound source. The microphones in each array may be acoustically shielded to a level that is sufficient for filtering out wind noise and other undesirable ambient sound, such as by placement of waterproof closed-cell polyurethane windscreens around a perimeter of the array.

A method for recognizing an infrasound event, which may be embodied as an adaptive algorithm and related hardware and software, includes detecting infrasonic wave energy in the form of an infrasound signal emitted by the infrasound event using one or more microphone arrays. Each microphone array has three equally-spaced infrasound microphones forming a respective vertex of an equilateral triangle. The method includes identifying, via a data acquisition system (DAS) or other suitable central or distributed computer system, a level of coherence of the detected infrasound signal from each possible pair of microphones, and recognizing the infrasound event via the DAS using the level of coherence and a time history of the detected infrasound signal.

The method may also include estimating properties of the recognized infrasound event via the DAS, including a magnitude, an azimuth angle, and an elevation angle of the infrasound event. A control action is thereafter executed via the DAS and/or other hardware device(s) in response to the estimated properties, such as including transmitting an electronic control signal from the DAS to a remote device indicative of the estimated properties.

These and other features, advantages, and objects of the present disclosure will be further understood and readily apparent from the following detailed description of the embodiments and best modes for carrying out the disclosure by referring to the specification, claims, and appended drawings.

BRIEF DESCRIPTION OF THE SEVERAL VIEWS OF THE DRAWINGS

FIG. 8 is a schematic logic flow diagram detailing an example subsurface embodiment of the present disclosure.

FIG. 9 is a schematic plan view illustration of an aircraft equipped with an infrasonic array in an example airborne application of the present disclosure.

Figure 1:
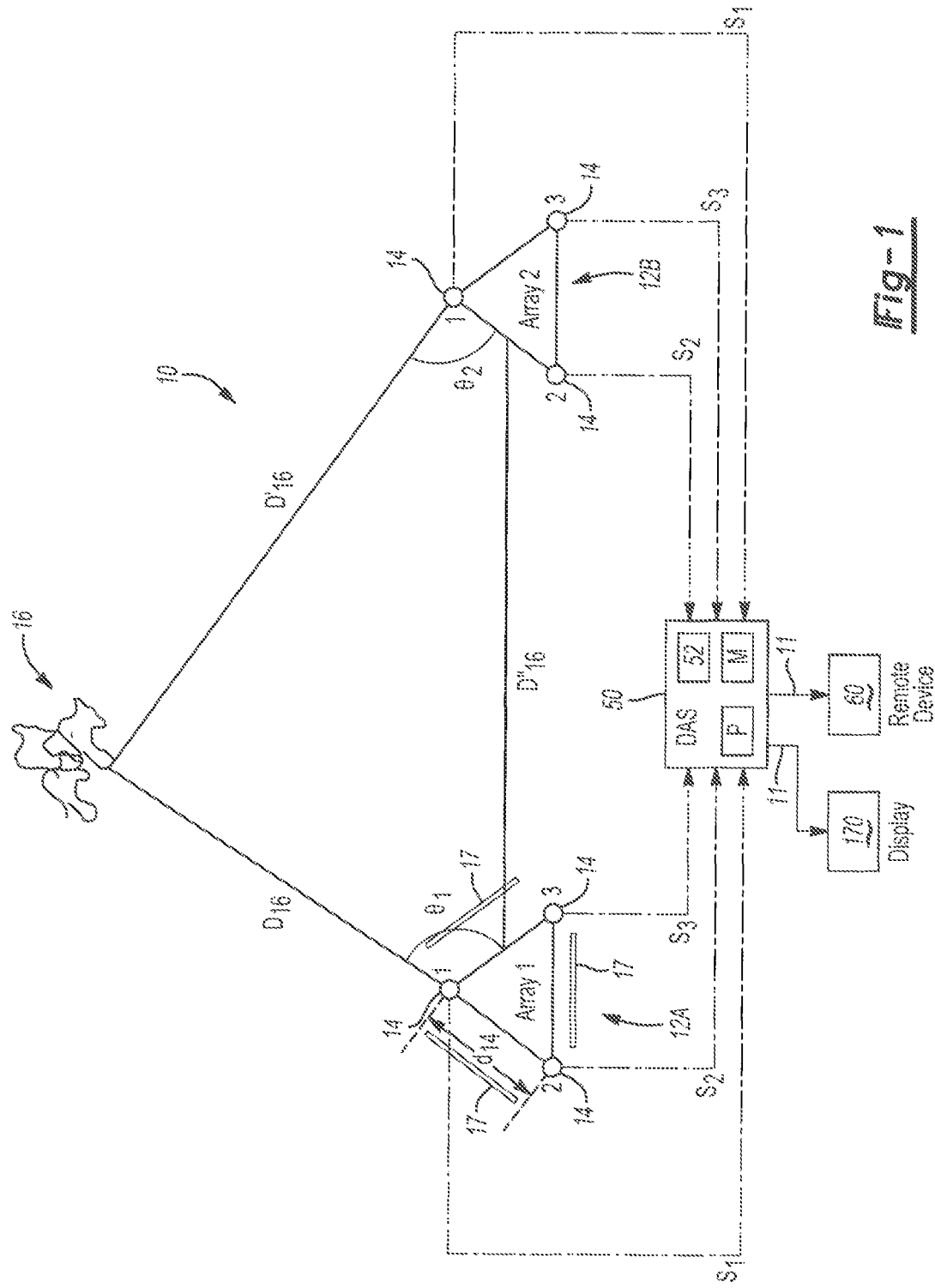
FIG. 1 is a schematic plan view illustration of an example set of infrasound microphone arrays used as part of an adaptive method for recognizing a low-frequency infrasound event as set forth herein.

The present disclosure is susceptible to various modifications and alternative forms, and some representative embodiments have been shown by way of example in the drawings and will be described in detail herein. It should be understood, however, that the novel aspects of this disclosure are not limited to the particular forms illustrated in the appended drawings. Rather, the disclosure is to cover all modifications, equivalents, combinations, and/or alternatives falling within the scope and spirit of the disclosure as defined by the appended claims.

DETAILED DESCRIPTION

For purposes of description herein, the terms "upper," "lower," "right," "left," "rear," "front," "vertical," "horizontal," and derivatives thereof shall relate to the invention as oriented in FIG. 1. However, various alternative orientations and step sequences are possible, except where expressly specified to the contrary. The specific devices and processes illustrated in the drawings and described in the following specification are intended as exemplary embodiments of the structure or processes as defined in the appended claims. Hence, specific dimensions and other physical characteristics relating to the representative embodiments disclosed herein are not limiting, unless the claims expressly state otherwise.

Referring to the drawings, wherein like reference numbers refer to the same or similar components throughout the several views, a system 10 is configured to recognize and track an infrasound source 16. The infrasound source 16 is typically dynamic or mobile and emits sonic wave energy, some of which falls in the 0-20 hertz (Hz) infrasound frequency range that is of particular interest in the present disclosure. The infrasound source 16 may take the form of any number of possible naturally occurring or manmade events, with various non-limiting example infrasound sources 16 noted above. The particular medium in which the infrasound source 16 presents itself may vary, and thus the system 10 may be readily modified for use in airborne, surface, or subsurface applications as described below.

Figure 3:
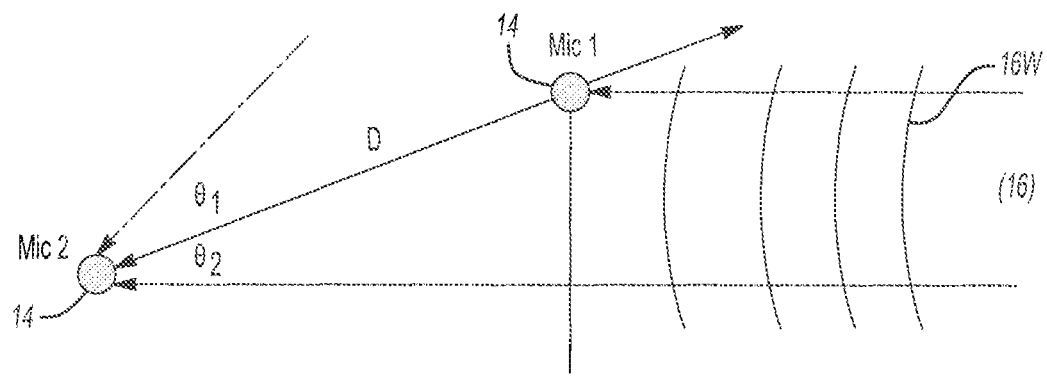
FIG. 3 is a schematic depiction of a time delay estimation technique usable as part of the method.

In the example embodiment shown in FIG. 1, the system 10 includes a plurality of microphone arrays 12A and 12B (labeled Array 1 and Array 2, respectively), which are spaced a distance $D''_{16}$ away from each other. The microphone arrays 12A and 12B are also shown as being a respective distance $D_{16}$ and $D'_{16}$ away from the infrasound source 16. As the infrasound source 16 is expected to move over time, the distances $D_{16}$ and $D'_{16}$ will vary over time. The infrasound source 16 is situated at an angle of elevation ($\theta_1$, $\theta_2$) with respect to each microphone array 12A and 12B, with the angles of elevation ($\theta_1$, $\theta_2$) described in further detail below with reference to FIG. 3.

In a simplified embodiment, the system 10 may include only one microphone array, e.g., either array 12A or array 12B in the simplified two-array configuration of FIG. 1. Other possible configurations may include more than the two depicted microphone arrays 12A and 12B so as to provide increased geographic coverage and improved tracking accuracy. Because each microphone array 12A and 12B may have an effective infrasonic listening range of up to several hundred kilometers, a relatively extensive amount of geographical territory may be monitored for the presence of the infrasound event 16 using a relatively small number of microphone arrays 12A and 12B.

Each microphone array 12A and 12B includes three equally-spaced infrasound microphones 14, with the infrasound microphones 14 arranged to form an equilateral triangle pattern as shown. In an example configuration, the infrasound microphones 14 may be embodied as electret condenser-type infrasound microphones 14. By way of illustration and not limitation, suitable example infrasound microphones 14 are disclosed in U.S. Pat. Nos. 8,401,217 and 9,591,417, the entire contents of which are hereby incorporated by reference as noted above.

Once the infrasound microphones 14 are arranged to form an equilateral triangle pattern, the infrasound microphones 14 may be shielded from wind noise and other ambient sound. For instance, a set of windscreens 17 may surround a perimeter of each of the microphone arrays 12A and 12B, with only one example set of windscreens 17 shown with respect to the microphone array 12A in FIG. 1 for illustrative simplicity. Each windscreen 17 may be optionally constructed of waterproof closed-cell polyurethane. Example subsurface wind screens that may be suitable for use in the present system 10 are disclosed in U.S. Pat. Nos. 8,671,763 and 9,620,025, the entire contents of which are incorporated by reference.

Each infrasound microphone 14 forms a respective vertex of an equilateral triangle, with the individual infrasound microphones 14 of a given array 12A or 12B separated a medium-specific distance $d_{14}$ away from other infrasound microphones 14 in the same array 12A or 12B as depicted in the lower left corner of FIG. 1. The infrasound microphones 14 may be positioned on a ground surface, on top of a building, or on another stationary surface, in which case the medium-specific distance $d_{14}$ may be about 100 feet (30.5 meters). In other embodiments, such as the airborne embodiment depicted in FIG. 9, the medium-specific distance $d_{14}$ may be about 50-100 feet (15.24-30.5 meters), e.g., when the infrasound microphones 14 are used on an airplane, unmanned aerial vehicle (UAV), or other airborne platform, or individually connected to separate vehicles such as separate piloted aircraft or UAVs and flown in the depicted triangular pattern. The infrasound microphones 14 may be alternatively embodied as hydrophones resting below a surface of a body of water, e.g., on or near a seafloor or lake bed, in which case the medium-specific distance $d_{14}$ may be about 1,500 feet (457 meters). The present approach may be used regardless of the medium of propagation of the infrasound waves emitted by the infrasound event 16. FIG. 8 as described below depicts one possible example embodiment in which the infrasound microphones 14 are located beneath a surface of the ground.

The system 10 shown in FIG. 1 further includes a server or Data Acquisition System (DAS) 50. The DAS 50 may be hardwired to or in wireless networked communication with each of the distributed infrasound microphones 14 in the microphone arrays 12A and 12B. Acoustic signals (arrows $S_1$, $S_2$, and $S_3$) are transmitted to the DAS 50 by respective first (1), second (2), and third (3) infrasound microphones 14 in each of the microphone arrays 12A and 12B. The DAS 50 may be embodied as one or more computer devices having requisite memory (M) and a processor (P) respectively storing and executing the disclosed algorithms/software, as well as any other necessary hardware, e.g., a clock or timer, input/output circuitry, etc. Memory (M) includes sufficient amounts of read only memory, for instance magnetic or optical memory. Instructions embodying the algorithm of the present method may be programmed into the memory (M) and executed by the processor (P) as needed to recognize and situationally act responsive to the infrasound source 16. As part of such a control action, the DAS 50 may be in networked communication with a display screen 170 and a remote device 60, either or both of which may be embodied as a display screen in an air traffic control tower, a cockpit of an aircraft, or a control bridge of a naval vessel, a warning siren or other alarm system, or a first responder/police, fire, or emergency rescue dispatch center, etc.

The present method contemplates use of the DAS 50 to analyze collected infrasonic data using an adaptive algorithm or method 52, i.e., software that is "adaptive" in the sense of learning the characteristics of infrasonic events over time so as to more quickly and accurately recognize such events when similar events are later detected. According to the disclosed method, the system 10 of FIG. 1 is able not only to detect and track the location of the infrasound source 16, but also to execute preemptive measures via transmission of a control signal (arrows 11), such as issuing an emergency alert signal to the display screen 170 in a cockpit of an aircraft or an air traffic control tower, activating an alarm such as an emergency siren or other remote device 60, or notifying first responders to initiate evacuation of a given geographical area. The method will now be described with reference to FIGS. 2A-F with additional reference to FIGS. 3-10B.

Figure 2A:
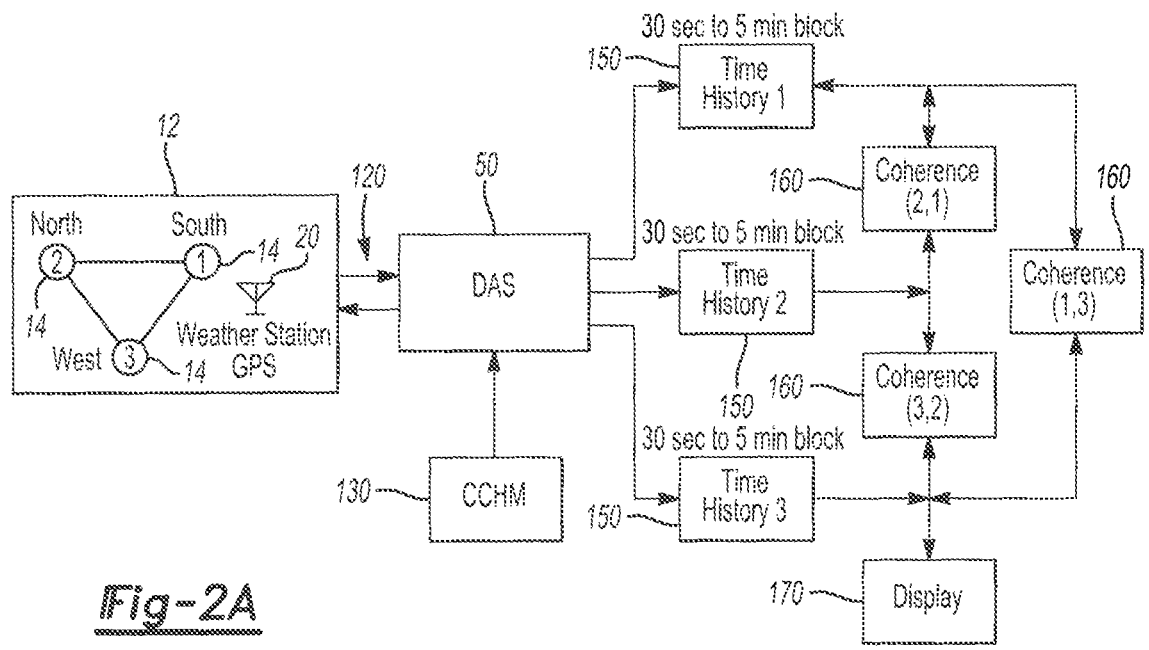
FIGS. 2A-E are schematic logic flow diagrams detailing an embodiment of the present adaptive method and the system used to execute the described method.

FIG. 2A schematically depicts a representative microphone array 12, such as either of the microphone arrays 12A or 12B of FIG. 1. The microphone array 12 may be in communication with a Global Positioning System (GPS) receiver 20, e.g., a weather station GPS receiver located in close proximity to the microphone array 12. The DAS 50 is in communication with the microphone array(s) 12 via network connections 120, e.g., hardwired transfer conductors or wireless communications channels. The DAS 50 may also be in communication with a control, communication, and health monitoring (CCHM) system 130, for instance a Labview-based computer device. As the name indicates, the CCHM system 130 may be configured for control, communication, and health monitoring of the microphone array 12 or multiple such arrays 12. Part of the programmed function of the CCHM system 130 may be the calibration of the individual infrasound microphones 14, such as by periodically exciting an internal diaphragm of the infrasound microphone 14 using a continuous audio tone, e.g., using an acoustic source installed near the infrasound microphone 14.

Figure 7:
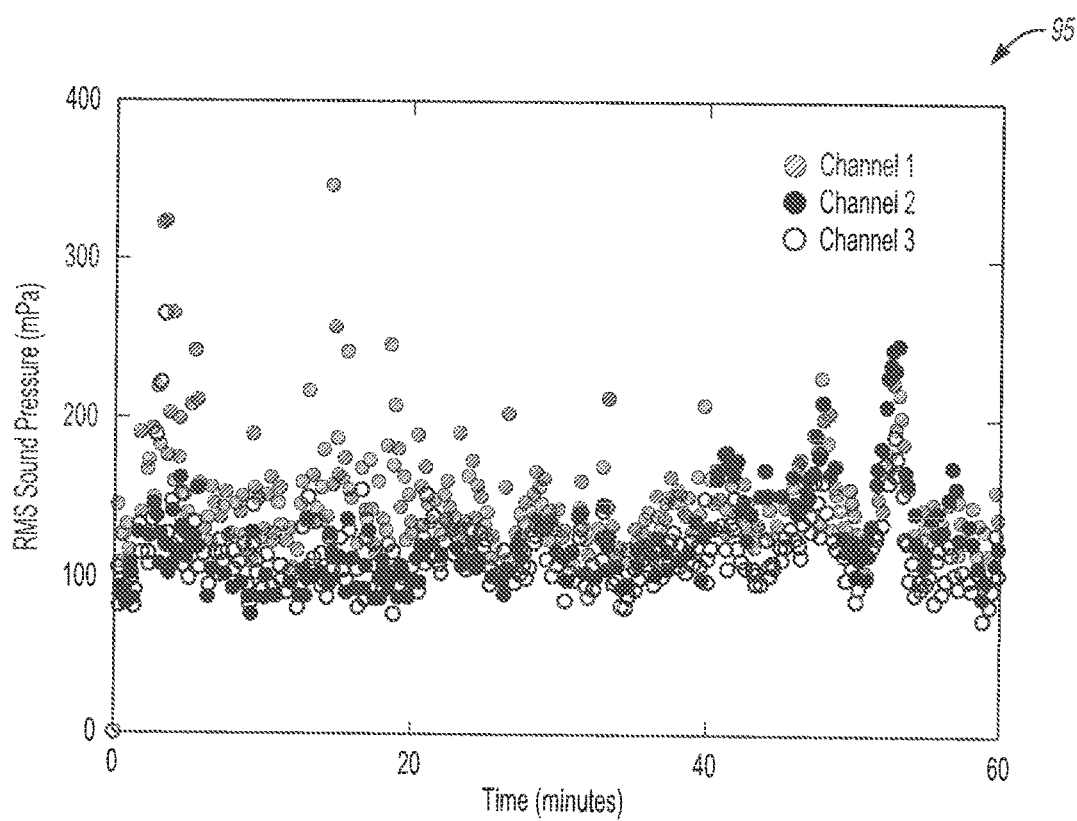

As part of the present method, the DAS 50 of FIG. 2A may calculate a time history of the collected acoustic data from each infrasound microphone 14 at corresponding Time History Blocks 150. Acoustic data may be recorded at a desired sampling rate, e.g., 200-500 samples per second, and then processed in suitable time blocks, with such time blocks ranging from 30 seconds to 5 minutes in a possible approach. The raw acoustic data may be displayed via the display screen 170 in real time, for instance as shown in the time plot 95 of FIG. 7 for acoustic channels 1, 2, and 3. The Time History Blocks 150 are separately labeled in FIG. 2A as Time History 1, Time History 2, and Time History 3 for illustrative clarity. By way of example, the root mean square (RMS) sound pressure in milli-Pascals (mPa) may be plotted against time as shown in FIG. 7. As is known in the art, RMS refers to the square root of the arithmetic mean of the squares of a set of numbers, in this instance the sound pressure of the received acoustic signals.

Figure 10A:
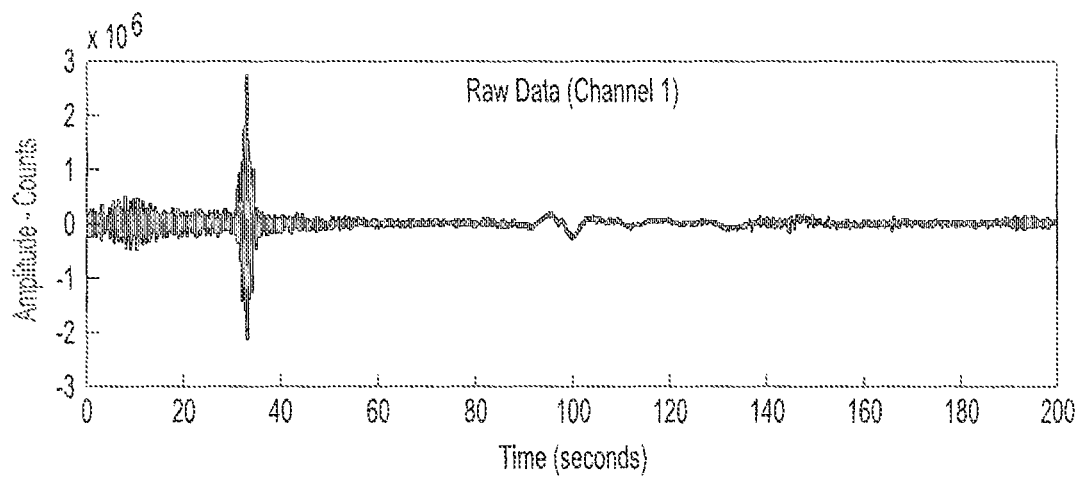
FIGS. 10A and 10B are schematic time plots of raw acoustic data in terms of count and frequency, respectively, with time depicted on the horizontal axis and count or frequency depicted on the vertical axis.
Figure 10B:
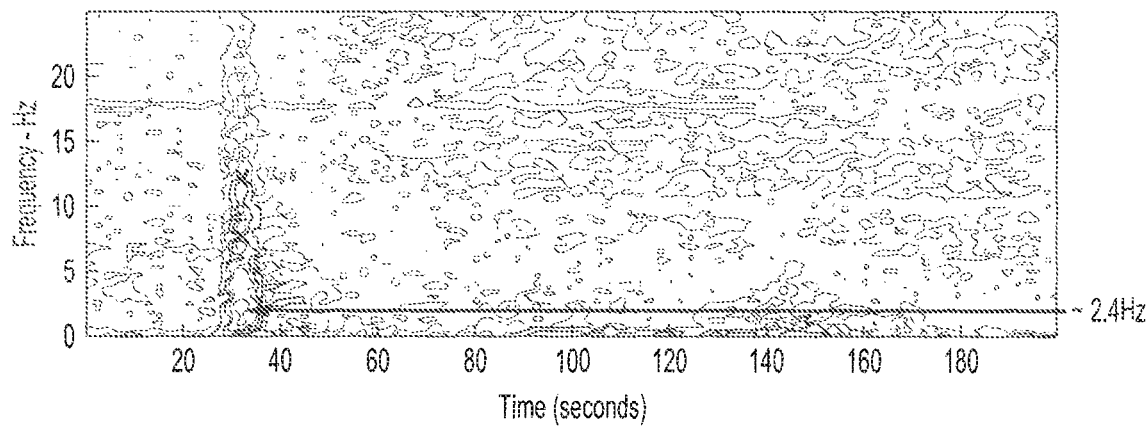
Figure 10C:
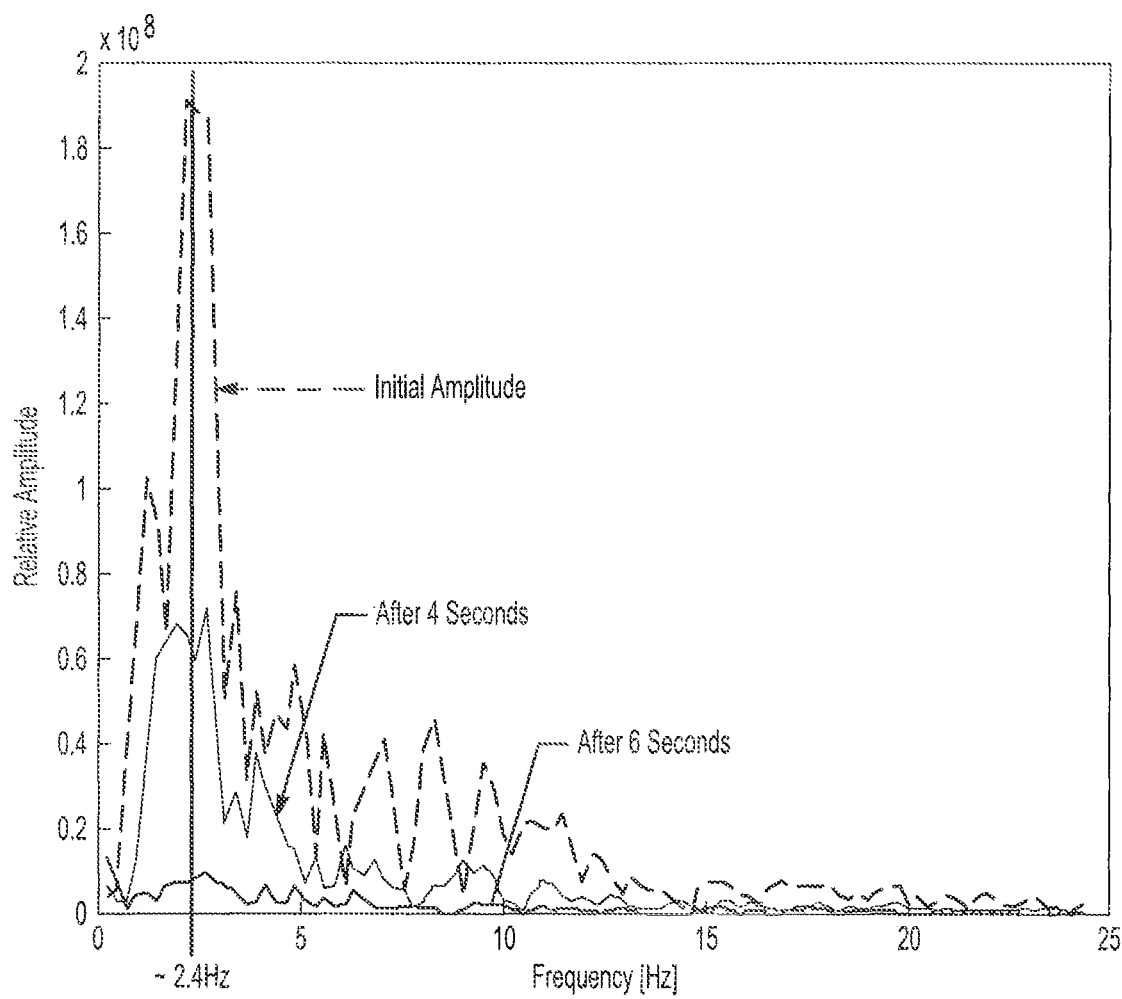
FIG. 10C depicts the sound pressure level of data at collection and after delays of 4 seconds and 6 seconds.

Referring briefly to FIGS. 10A, 10B, and 10C, example raw acoustic data illustrates the possible functionality of the Time History blocks 150 of FIG. 2A for an infrasonic frequency range of 0-25 Hz. FIG. 10A depicts raw acoustic data on Channel 1 (the microphone 14 labeled "1" in FIG. 2A), with amplitude in number of counts depicted on the vertical axis and time in seconds depicted on the horizontal axis. FIG. 10B depicts, for the same example time period, the corresponding acoustic frequencies of the various events counted in FIG. 10A. FIG. 10C depicts the sound pressure level of Channel 1 data at collection and after delays of 4 seconds and 6 seconds. The entire time history is thus collected and available to the DAS 50 for display and subsequent processing steps.

Referring again to FIG. 2A, in a subsequent processing block the DAS 50 may calculate a level of signal coherence between different microphone pairs, doing so via a corresponding Coherence Calculation block 160. That is, each microphone array 12 has three infrasound microphones 14, which in turn are labeled 1, 2, and 3 and nominally associated with relative directions South, North, and West. The infrasound microphone 14 labeled "1" may be paired with the infrasound microphones 14 labeled "2" or "3", leaving a final microphone pair, i.e., the infrasound microphones 14 labeled "2" and "3". Thus, the pair abbreviations (2, 1), (3, 2), and (1, 3) of FIG. 2A and the remaining Figures refer to three different possible pairings of infrasound microphones 14.

As is well known in the art of digital and analog signal processing, a measure of signal coherence ranges from 0 to 1 and describes, in relative terms, whether the acoustic signals received by the infrasound microphones 14 of a given microphone array 12 originate from the same infrasound source 16. The received acoustic signals must all "look" sufficiently alike on all three available channels of the microphone array 12 in order to reveal a sufficiently high coherence level, with "1" indicating identical signals. Thus, part of recognizing the infrasound source 16 within the scope of the disclosure is identifying the geolocation of the infrasound source 16 as closely as possible using the Time History blocks 150 and the signal coherence in each possible pairing of the infrasound microphones 14 via the Coherence Calculation blocks 160. Different ways of accomplishing the general process shown in FIG. 2A will now be described with reference to the remaining Figures.

Figure 2B:
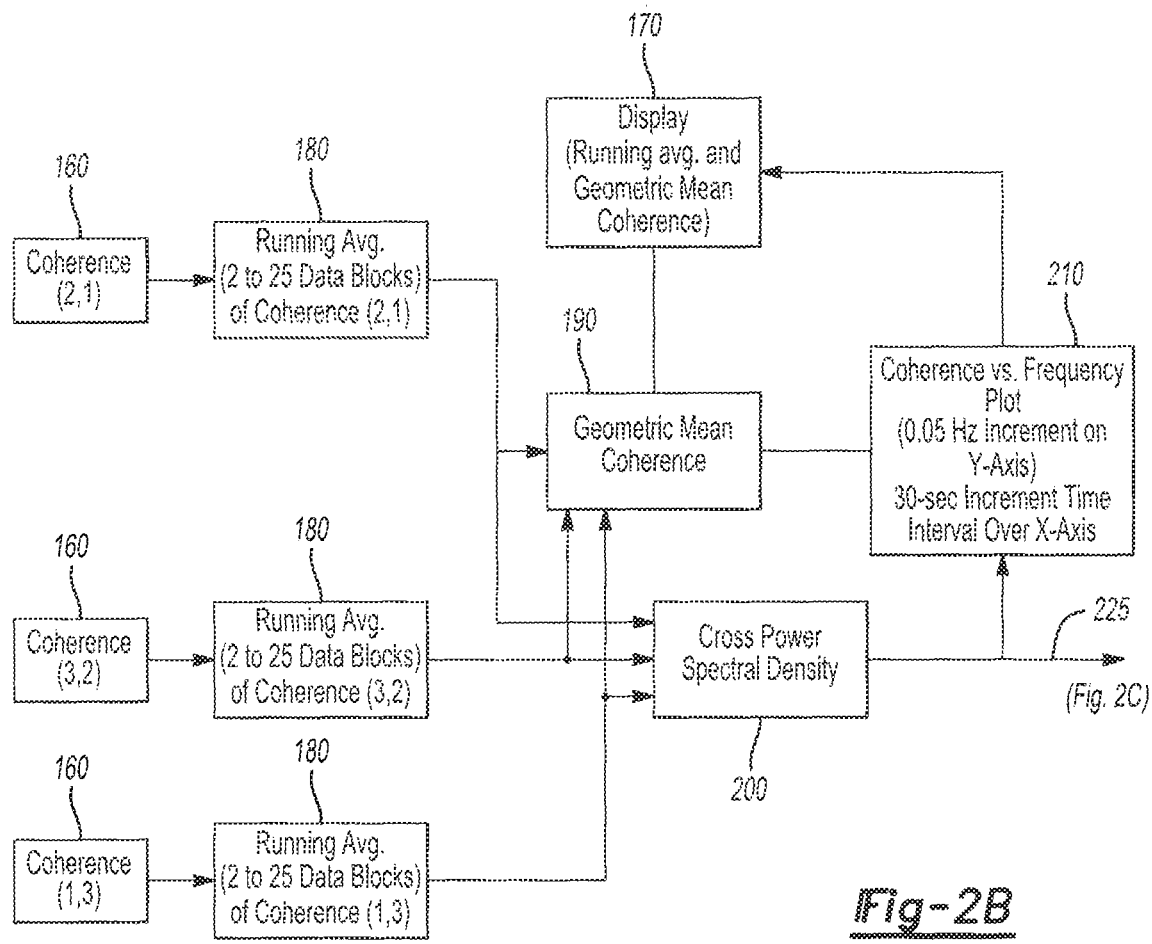

FIG. 2B continues the description of the method 52. Upon calculation of the coherence levels via the Coherence Calculation blocks 160, the method 52 may proceed by calculating a running average of such coherence levels, for instance using a plurality of Running Average (Avg.) blocks 180. As few as two and as many as twenty-five or more groups or blocks of such data may be used in different embodiments depending on the application and the desired accuracy.

The calculated running average of the coherence levels from blocks 160 may be output to two additional logic blocks, i.e., a Geometric Mean Coherence block 190 and a Cross Power Spectral Density block 200, respectively. At block 190, the DAS 50 of FIG. 2A may calculate the geometric mean of the running average of coherence levels between all three possible microphone pairs. At the same time, block 200 may be used to calculate the cross power spectral density (arrow 225) using data from blocks 180. Thereafter, the DAS 50 may generate a plot of coherence versus frequency at logic block 210, e.g., at 0.05 Hz increments, which may be displayed via the display screen 170 if so desired.

Figure 2C:
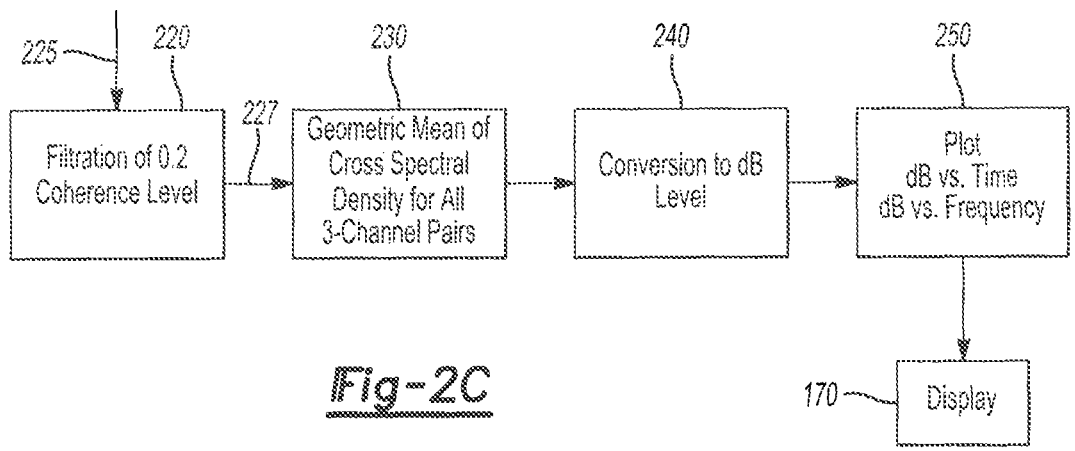

In FIG. 2C, the method 52 continues with an optional Filtration block 220, which receives the cross power spectral density information (arrow 225) from block 200 of FIG. 2B and performs a calibrated signal filtering operation, e.g., low-pass filtering, on the received information (arrow 225). For example, acoustic data having a signal coherence level of less than 0.2 or another sufficiently low threshold may be discarded by the DAS 50. The resultant filtered data set (arrow 227) is fed into a Geometric Mean calculation block 230, whereupon the DAS 50 of FIG. 2A calculates the geometric mean of the cross spectral density information for all three filtered channel/microphone pairs. Thereafter, this information may be converted to the decibel (dB) scale using a Data Conversion block 240 and plotted versus time and/or frequency via a Plotting block 250 for subsequent display via the display screen 170.

Figure 2E:
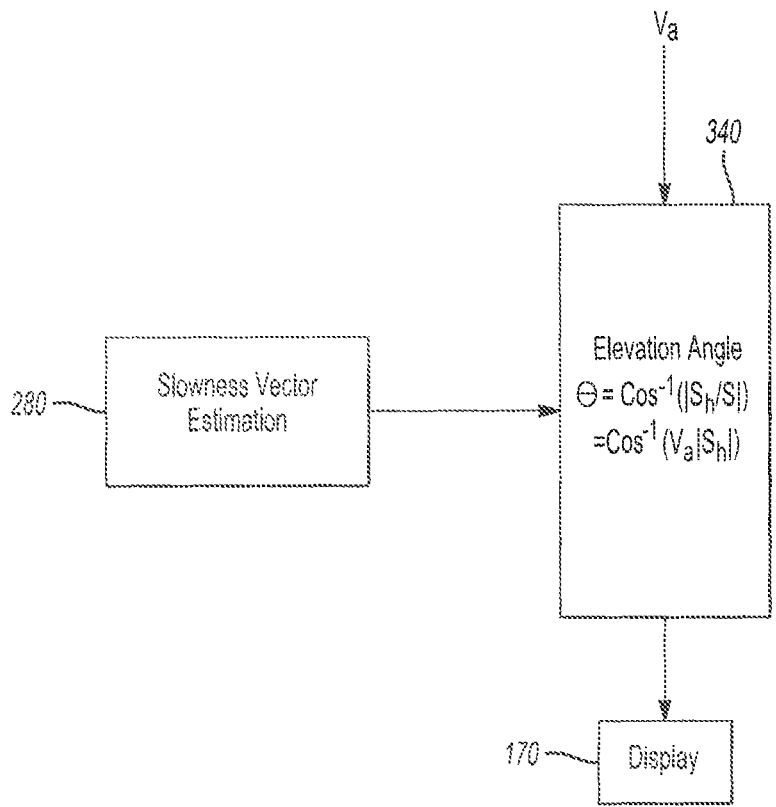
Figure 2D:
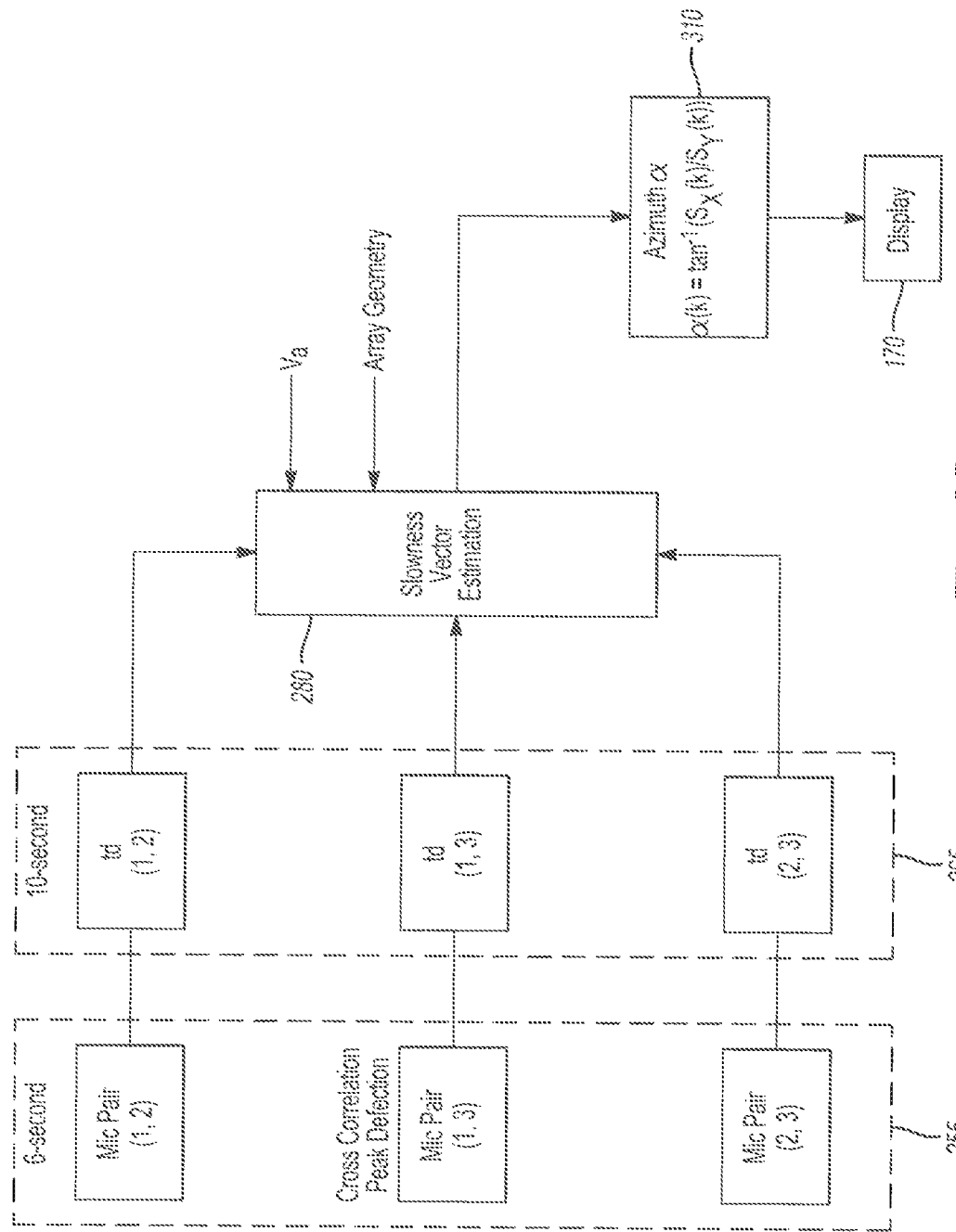

FIGS. 2D and 2E describe an example sub-process for estimating the angle of arrival/elevation angle of the sound from the infrasound source 16. A Time Delay block 265 (t-delay (1,2), (1,3), and (2,3)), which may be understood with additional reference to FIG. 3, involves the calculation of a time delay of an infrasound signal 16W (FIG. 3) over a calibrated time window, e.g., 6 seconds. For instance, in viewing FIG. 3 the time delay may be calculated using the Time Delay block 265 of FIG. 2D as:

$$Td = D \frac{\cos(\theta)}{V_S}$$

with D representing the medium-specific distance ($d_{14}$) between infrasound microphones 14 (Mic 1, Mic 2) and $V_S$ being the temperature-adjusted speed of sound. The angles of elevation ($\theta_1$, $\theta_2$) thus may be represented as:

$$\theta_{1,2} = \pm \cos^{-1}\left(\frac{V_S T_{delay}}{D}\right)$$

FIGS. 2D and 2E describe a process of estimating the acoustic time delays (td) between each pairs of microphones 14 from which the angle of arrival/elevation angle of the received infrasound signal from the infrasound source 16 may be estimated. The time delay estimates are achieved via cross-correlating of the time series from each pair of microphones 14, e.g., microphone pair (1, 2) and locating the cross correlation peak using a peak detection method. For instance, one may use a 6-second time frame for the cross-correlation calculation. Cross Correlation Block 255 of FIG. 2D is used to calculate the cross-correlation and cross-correlation peak time delay between all three microphone pairs (1, 2), (2, 3), and (3, 1). As is known in the art, cross-correlation refers to a measure of similarity of a first pair of signal data to a second pair as a function of the lead or lag. As noted above, typical parameters for such a calculation are 6 second time windows for band-limited signals of 0.1-15 Hz. However, the present approach permits a user to select other parameter configurations. For example, if the sensor data are sampled at 500 Hz, this would provide cross-correlation on 3000 datum points.

The above-noted calculations may be performed every second for ten seconds creating a set of ten time delay estimates for each possible pair of microphones 14. From this set, empirical metrics may be applied to determine the best estimate of the time delay per the 10 second interval. Such metrics might include eliminating estimates where a cross-correlation peak fall below a user-defined threshold and taking the mean of the "good" estimates, as shown schematically in FIG. 2D. The 3 sensor pair time delay estimates per 10 seconds may be operated on by a least mean square estimation algorithm or other suitable approach to yield the slowness vector, S. That is, with X representing a matrix defining the displacement coordinates of the microphone array, the classic least squares estimate of S is thus specified as $S=(X^T X)^{-1} X^T t_d$, where $S=\{S_x : S_y\}$.

From data output from the block 255 and 265, the DAS 50 of FIG. 2A may next calculate a slowness vector ($S_Y$, $S_X$) at Slowness Vector Estimation block 280 using an adjusted speed of sound ($V_a$) and a known array layout or geometry, doing so for all three cross-correlation peak time delays from time Delay block 265, thereafter possibly calculating horizontal or ground plane projections of the slowness vector ($S_Y$, $S_X$). The magnitude of the slowness vector represents the reciprocal of the relative velocity of sound across a given microphone array 12. Numerically, a slowness vector, normalized to an ambient acoustic velocity and having an absolute value between 0 and 1 indicates the infrasound source moving toward the microphone array 12, e.g., an aircraft in flight, or the direction of the source 16 being elevated from the horizon. A level above 1 of the slowness vector nominally results from sources 16 moving away from the array 12. A slowness vector of exactly 1 is indicative of incoming infrasound at a level of the horizon.

Figure 4:
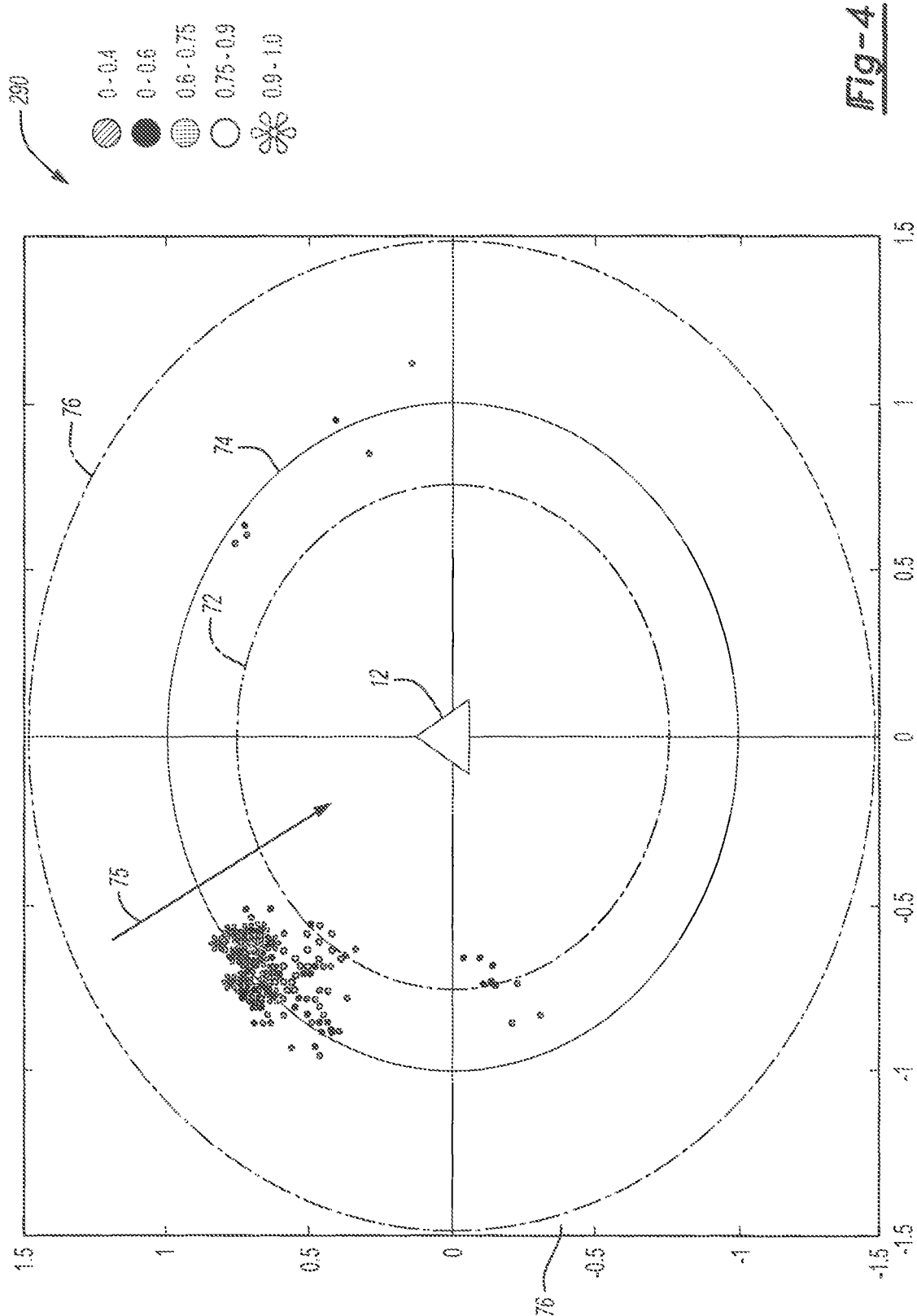
FIG. 4 is a schematic mapping of event slowness as used by the present method.
Figure 6:
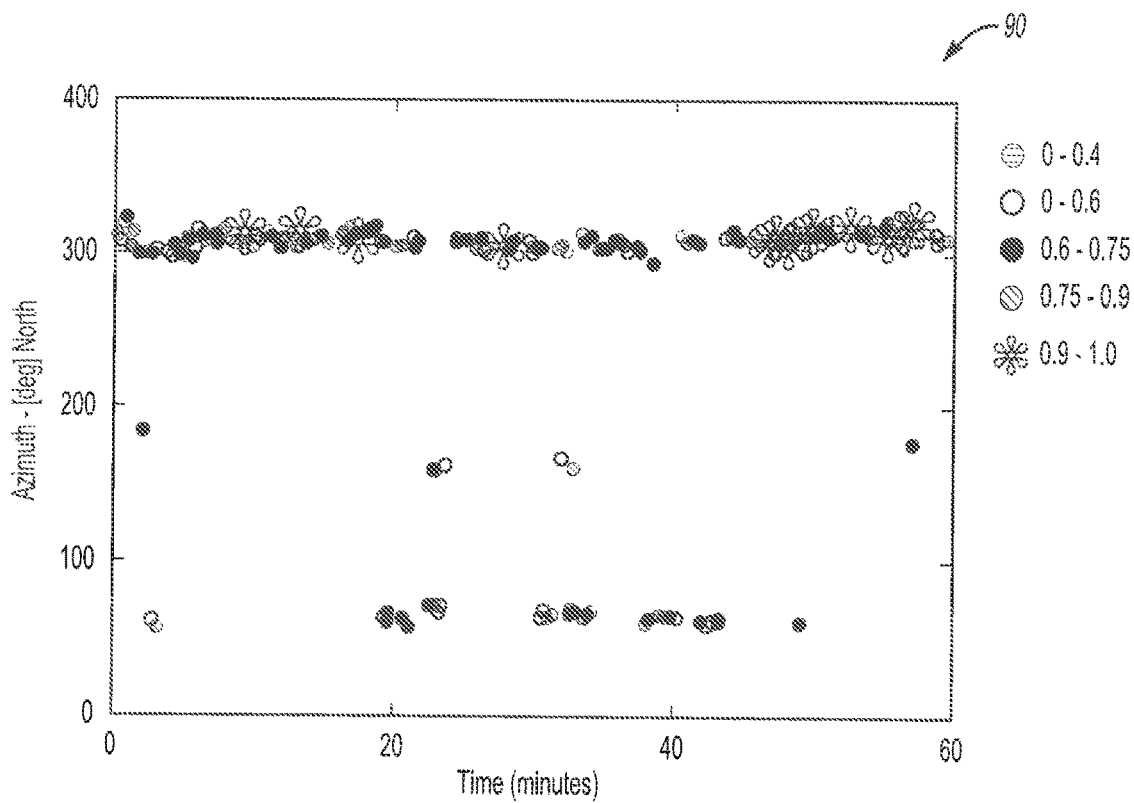
FIGS. 6 and 7 are schematic time plot depictions of azimuth and root mean square (RMS) sound pressure, respectively.

Referring briefly to FIG. 4, a normalized slowness map 290 is shown as a possible output of Slowness Vector Estimation block 280 of FIG. 2D. The microphone array 12 is located at the center of a set of concentric circles 72, 74, and 76. Circle 72 represents an example slowness of 0.66 corresponding to an elevation angle of 41°. Circle 74 represents a slowness of 1, with propagation horizontal to the ground. Circle 76 represents a slowness of 1.5, which may be indicative of wind-aided or seismic signals. Arrow 75 is indicative of propagation of signals from a relatively high elevation. The coherence levels of the various circles 72, 74, and 76 and arrow 75 may be assigned a corresponding score, e.g., 0-0.4, 0.4-0.6. 0.6-0.75, 0.75-0.9, and 0.9-1.0. Each coherence band may be assigned a corresponding symbol as shown so as to render the information intuitive when displayed on the display screen 170 of FIG. 2D.

At Azimuth Calculation block 310 of FIG. 2D, the DAS 50 of FIG. 2A next calculates the azimuthal angle (α) as follows:

$$\alpha(k) = \tan^{-1}\left(\frac{S_X(k)}{S_Y(k)}\right).$$

As with the earlier-described logic blocks, the calculated data may be optionally displayed via the display screen 170. An example depiction is provided via an azimuth time plot 90 in FIG. 6, with geometric mean coherence level assigned a corresponding score, e.g., 0-0.4, 0.4-0.6, 0.6-0.75, 0.75-0.9, and 0.9-1.0, and the scores plotted with respect to Azimuth Angle (e.g., 0-360 degrees with respect to true North) and time in minutes.

Figure 5:
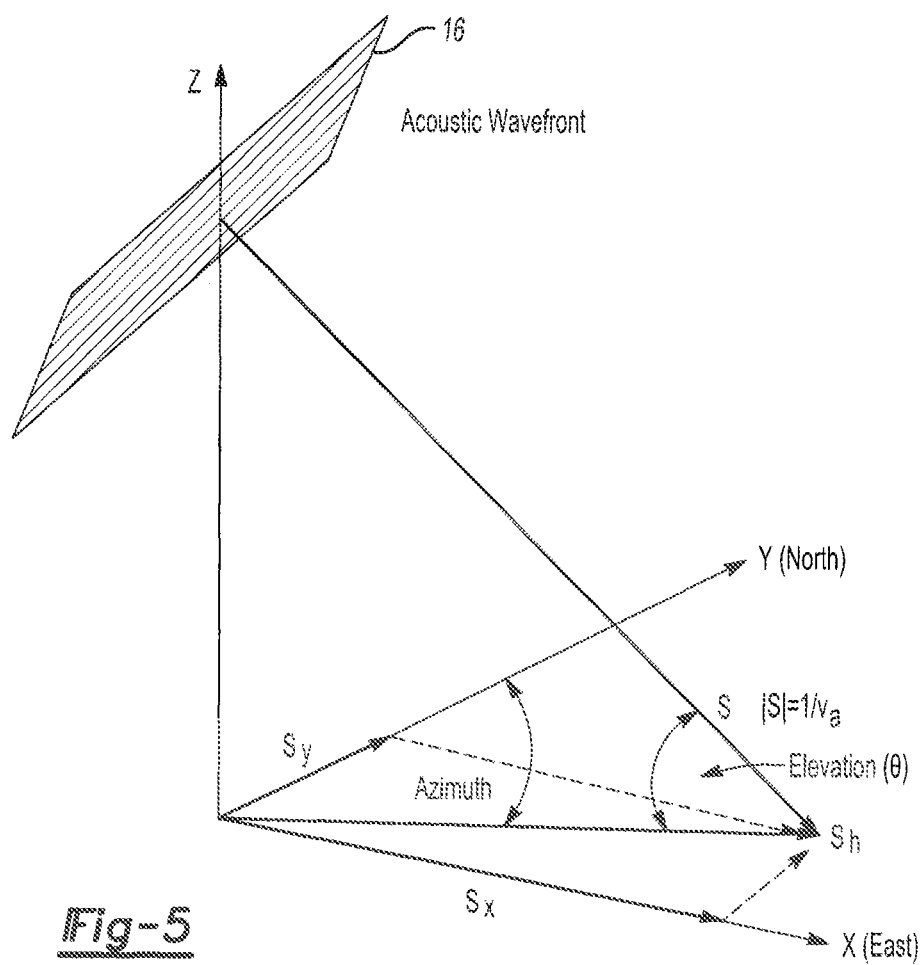
FIG. 5 is a schematic depiction of elevation and azimuth angle calculation usable as part of the present method.

FIG. 2E depicts a calculation occurring at Elevation Angle Calculation block 340 of the elevation angle (θ) to the infrasound source 16, which may be understood with additional reference to FIG. 5 wherein the infrasound source 16 is labeled "Acoustic Wavefront". The elevation angle (θ) of the infrasound source 16 is estimated from the horizontal or ground plane projections shown in FIG. 5, with the vector normal to the assumed infrasonic plane wave emitted by the infrasound source 16 and expressed in units of inverse velocity. Along with the estimated slowness vector component provided from the Slowness Vector block 280 as described above with reference to FIG. 2D, block 340 of FIG. 2E determines or receives a speed of sound ($V_a$), which as known in the art may be adjusted to the temperature of the surrounding environment. Using the slowness vector and adjusted speed of sound ($V_a$), block 340 may be used to calculate the elevation angle (θ). For instance:

$$\theta = \cos^{-1}\left(\left|\frac{S_h}{S}\right|\right) = \cos^{-1}(v_a|S_h|)$$

$$\text{where } |S| = \frac{1}{V_a}.$$

If $V_a$ is not known, the standard speed of sound of 343.2 m/s at 20° C. may be assumed.

The system 10 of FIG. 1 as described with reference to FIGS. 3-7 may be alternatively configured for sub-surface applications, such as in the case of the system 10A of FIG. 8 or airborne applications such as with the system 10B shown in FIG. 9. The approach does not change with the medium of propagation. However, because the speed of sound varies with the medium, the relative spacing of the infrasound microphones 14 will vary with changes in the medium. That is, sound waves propagate by vibrating molecules of the particular medium of propagation. Because the molecules constituting solid ground are more densely packed than liquid molecules, which in turn are more densely packed than air molecules, infrasound energy travels much faster through solid ground than it does through liquid water, and even faster through air. Additionally, temperature affects the speed of sound, and thus temperature should be accounted for in the execution of the method.

For instance, as shown in FIG. 8. when the microphone array 12 is used below the surface 30 of solid ground, such as to listen for distant earthquakes, the microphone array 12 may be placed approximately 10-50 feet (3-15 meters) below the surface 30, and the medium-specific distance $d_{14}$ between infrasound microphones 14 may be at least 1500 feet (457 meters), with the actual distance being determined by the soil composition and temperature. The array 12 may be positioned parallel to the surface 30 such that the array 12 is shown in schematic plan view in FIG. 9. When the surface 30 is that of a body of water rather than a solid ground surface, the medium-specific distance $d_{14}$ may be about 1,500 feet (457 meters). The infrasound microphones 14 in such an embodiment may be infrasonic hydrophones configured to transmit signals wirelessly to the DAS 50, which in turn may be located in a control room on land or on a buoy floating on the surface 30.

FIG. 9 shows an example of an alternative system 10B that is usable in an airborne embodiment of the present method. In the depicted embodiment, a microphone array 12C of three microphones 14A, 14B, and 14C are positioned on the wings 15A and 15B and tail 15C of an example aircraft 85 in order to form the equilateral triangle pattern described above. In a single aircraft embodiment, the aircraft 85 may be a large fixed wing aircraft, such that the distance $d_{14}$ is about 50 to 100 feet (15-30 meters). The DAS 50 and display 170 may be positioned aboard the aircraft 85, or on the ground or otherwise remotely located.

Other airborne embodiments may be realized in which, rather than attaching the infrasound microphones 14A, 14B, and 14C to a single aircraft 85 as shown, each infrasound microphone 14A, 14B, and 14C is instead attached to a corresponding aircraft 85, e.g., a fixed wing or rotary wing piloted or unmanned aerial vehicle (UAV). In such an embodiment, each aircraft 85 may fly as closely as possible in the equilateral triangular pattern to maintain the distance $d_{14}$ between the infrasound microphones 14A, 14B, and 14C.

As with the system 10A of FIG. 8, the system 10B shown in FIG. 9 operates according to the method set forth in FIGS. 2A-E, and thus the present method 52 is suitable for use in recognizing ground-based, airborne, underground, and underwater low frequency events in the infrasound range. The particular layout of the infrasound microphones 14, data acquisition, and signal processing via the DAS 50 demonstrates the potential to detect and recognize the direction of infrasound signals emitted by the infrasound source 16 of FIG. 1. The criteria for effective signal detection, i.e., concomitancy, coherence, directionality, and characteristic signatures, are thus realized using any of the systems 10, 10A, and 10B and associated software-based methodology described in detail herein.

Also made possible by the present disclosure is a national network of microphone arrays 12. A national network of around thirty infrasonic microphone arrays 12 is expected to cover an area the size of the territory of the continental United States sufficiently for tracking severe weather, tornadoes, hurricanes, clear air turbulence for the aviation industry, and possibly precursors to earthquakes and tsunamis. For instance, clear air turbulence may exhibit infrasonic emissions having frequencies in the range of 0.2 to 4 Hz. Once an infrasonic signature indicative of clear air turbulence and the intensity of such an event is determined by the system 10 of FIG. 1, the DAS 50, using the method 52, may alert pilots in the area via the display screen 170. Color-coded data may be displayed, e.g., the emergency alert signal may be color-coded to indicate relative severity of at least one of the estimated properties, such as red indicating severe turbulence, yellow indicating medium-level turbulence, green indicating low-level turbulence, and blue indicating smooth flight/no turbulence. Use of the method 52 could allow for alerting of pilots several minutes prior to entering a pocket of such turbulence, possibly enabling the pilot to avoid the pocket entirely.

In terms of adaptability of the method 52, the method 52 used by the system 10 of FIG. 1 may include cataloguing, e.g., in memory (M) of the DAS 50, a library or catalogue of infrasonic signatures from a number of previously-detected and recognized infrasound sources 16 over time. Using pattern recognition such as neural networks or simple acoustic signature comparison, the DAS 50 may be used to quickly identify the infrasound source 16 and, using the method 52 as set forth above with reference to FIGS. 2A-10B, the direction or heading of such an infrasound source 16. Thus, signatures of aircraft, tornadoes, and other natural or manmade sources of infrasound can be collected over time and used to fine-tune the accuracy of identification of the infrasound source 16. These and other benefits will be readily apparent to one of ordinary skill in the art in view of the present disclosure.

The detailed description and the drawings or figures are supportive and descriptive of the disclosure, but the inventive scope is defined solely by the claims. While some of the best modes and other embodiments for carrying out the disclosure have been described in detail herein, various alternative designs and embodiments exist within the intended scope of this disclosure. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

What is claimed is:

1. A method for detecting and tracking a mobile or dynamic ultrasound source, the method comprising;
   detecting infrasonic signals using one or more microphone arrays, each of the microphone arrays having three equally-spaced infrasound microphones arranged to form a respective vertex of an equilateral triangle;
   identifying, via a data acquisition system (DAS), a level of coherence of the detects d infrasound signals from each possible pair of the infrasound microphones;
   detecting and tracking a location of the mobile or dynamic infrasound source via the DAS using the level of coherence and a time history of the detected Ultrasound signals;
   estimating properties of the mobile or dynamic infrasound source via the DAS, including a magnitude, an azimuth angle, and an elevation angle of the mobile or dynamic infrasound source; and
   executing a control action via the DAS in response to the estimated properties, including transmitting an electronic control signal from the DAS to a display screen or a remote device indicative of the estimated properties.

2. The method of claim 1, wherein detecting and tracking the location of the Ultrasound source via the DAS includes comparing a pattern of the detected infrasound signals to a catalogue or library of patterns of previously-detected infrasound signals.

3. The method of claim 1, wherein the electronic control signal is an emergency alert signal, and wherein executing the control action includes transmitting the emergency alert signal to the display screen or the remote device.

4. The method of claim 3, wherein the display screen or the remote device includes a display screen of an aircraft cockpit or an air traffic control tower.

5. The method of claim 1, further comprising filtering out the infrasonic signals when the infrasonic signals are below a threshold low level of coherence.

6. The method of claim 1, wherein detecting the infrasonic signals includes using a single microphone array in which the three equally-spaced ultrasound microphones are connected to at least one aircraft.

7. The method of claim 6, wherein the at least one aircraft is a single aircraft having a pair of wings and a tail, with the three equally-spaced Ultrasound microphones each connected to one of the pair of wings or the tail, respectively.

8. The method of claim 7, wherein the three equally-spaced Ultrasound microphones are spaced about 50-100 feet (15.24-30.5 meters) apart from each other.

9. The method of claim 1, further comprising submerging the one or more microphone arrays about 10 to 50 feet (3-15 meters) below a surface of a body of water, and positioning the Ultrasound microphones about 1500 feet (457 meters) apart from each other.

10. The method of claim 1, further comprising burying the one or more microphone arrays about 10 to 50 feet (3-15 meters) below a ground surface such that the three equally-spaced infrasound microphones are at least 1500 feet (457 meters) apart from each other.

11. A system for detecting and tracking a mobile or dynamic Ultrasound source, the system comprising:
    a plurality of microphone arrays each having three equally spaced infrasound microphones forming a respective vertex of an equilateral triangle, each of the microphones configured to detect infrasonic acoustic signals emitted by the mobile or dynamic infrasound source;
    a data acquisition system (DAS) in communication with the microphone arrays, and configured to identify a level of coherence of the detected infrasonic acoustic signals from each possible pair of the infrasound microphones, detect and track the infrasound source using the level of coherence and a time history of the detected infrasonic acoustic signals, estimate properties of the mobile or dynamic Ultrasound source via the DAS, including a magnitude, an azimuth angle, and an elevation angle of the infrasound event, and execute a control action in response to the estimated properties, including transmitting an electronic control signal from the DAS to a display screen or a remote device indicative of the estimated properties.

12. The system of claim 11, wherein the DAS is configured to detect and track the infrasound source by comparing a pattern of the detected infrasonic acoustic signals to a library or catalogue of patterns of previously-detected infrasonic acoustic signals.

13. The system of claim 11, wherein the electronic control signal is an emergency alert signal.

14. The system of claim 11, wherein the DAS is configured to filter out any of the infrasonic acoustic signals having a level of coherence below a threshold level of coherence.

15. The system of claim 11, further comprising an aircraft having a pair of wings and a tail, wherein the Ultrasound microphones of the microphone arrays are connected to a respective one of wings and tail.

16. The system of claim 15, wherein the at least one aircraft is a single aircraft having a pair of wings and a tail, with the three equally-spaced infrasound microphones of each respective one of the arrays spaced about 50-100 feet (15.24-30.5 meters) apart from each other.

17. The system of claim 11, wherein the microphone arrays are buried or submerged at least 10 to 50 feet (3-15 meters) below a ground surface or a surface of a body of water, respectively, and wherein the infrasound microphones of each respective one of the arrays are positioned at least 1500 feet (457 meters) apart from each other.

18. The method of claim 1, further comprising:
cross-correlating, via the DAS, the time series from each pair of the microphones in one microphone array of the one or more microphone arrays;
locating a cross correlation peak time delay between each of three microphones in the one microphone array to thereby provide three cross-correlation peak time delays; and
calculating a slowness vector via the DAS for the three cross-correlation peak time delays, wherein a magnitude of the slowness vector having an absolute value of between 0 and 1 is indicative of the source moving toward the one microphone array, an absolute value of exactly 1 is indicative of incoming infrasound at a level of the horizon, and an absolute value above 1 is indicative of the source moving away from the one microphone array.

19. The system of claim 11, wherein the DAS is configured to:
cross-correlate the time series from each pair of the microphones in one microphone array of the one or more microphone arrays;
locate a cross correlation peak time delay between each of three microphones in the one microphone array to thereby provide three cross-correlation peak time delays; and
calculate a slowness vector via the DAS for the three cross-correlation peak time delays, wherein a magnitude of the slowness vector having an absolute value of between 0 and 1 is indicative of the source moving toward the one microphone array, an absolute value of exactly 1 is indicative of incoming Ultrasound at a level of the horizon, and an absolute value above 1 is indicative of the source moving away from the one microphone array.

20. The system of claim 11, further comprising a control, communication, and health monitoring (CCHM) system in communication with the DAS and the one or more microphone arrays, wherein the CCHM system is configured to calibrate the microphones by, periodically exciting the microphones using a continuous audio tone.

\* \* \* \* \*